US008773423B2

(12) United States Patent
Sun et al.

(10) Patent No.: US 8,773,423 B2
(45) Date of Patent: Jul. 8, 2014

(54) CREATING OPTIMIZED GRADIENT MESH OF A VECTOR-BASED IMAGE FROM A RASTER-BASED IMAGE

(75) Inventors: Jian Sun, Beijing (CN); Lin Liang, Beijing (CN); Fang Wen, Beijing (CN); Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1053 days.

(21) Appl. No.: 11/800,680

(22) Filed: May 7, 2007

(65) Prior Publication Data

US 2008/0278479 A1 Nov. 13, 2008

(51) Int. Cl.
*G06T 15/00* (2011.01)

(52) U.S. Cl.
USPC .......................................... 345/419; 345/423

(58) Field of Classification Search
None
See application file for complete search history.

(56) References Cited

U.S. PATENT DOCUMENTS

| | | | |
|---|---|---|---|
| 5,889,524 A * | 3/1999 | Sheehan et al. ............... | 345/419 |
| 6,226,400 B1 | 5/2001 | Doll | |
| 6,256,039 B1 * | 7/2001 | Krishnamurthy .............. | 345/420 |
| 6,271,861 B1 * | 8/2001 | Sargent et al. ................. | 345/589 |
| 6,473,079 B1 | 10/2002 | Kacyra et al. | |
| 6,774,907 B1 | 8/2004 | Gupta | |
| 6,784,896 B1 * | 8/2004 | Perani et al. .................. | 345/589 |
| 6,816,155 B1 | 11/2004 | Ogawa | |
| 6,853,373 B2 * | 2/2005 | Williams et al. .............. | 345/419 |
| 6,870,954 B1 | 3/2005 | Gupta | |
| 6,978,230 B1 * | 12/2005 | Klosowski et al. ............... | 703/7 |
| 7,038,697 B2 | 5/2006 | Gangnet et al. | |
| 7,047,014 B1 | 5/2006 | Friday et al. | |
| 7,123,269 B1 | 10/2006 | Bourdey et al. | |
| 7,847,823 B2 | 12/2010 | Habuka et al. | |
| 2002/0158870 A1 | 10/2002 | Brunkhart et al. | |
| 2004/0164992 A1 | 8/2004 | Gangnet et al. | |
| 2005/0063582 A1 | 3/2005 | Park et al. | |
| 2006/0013505 A1 * | 1/2006 | Yau et al. ..................... | 382/285 |
| 2007/0030267 A1 | 2/2007 | Nigro | |

FOREIGN PATENT DOCUMENTS

KR 10-2006-0131145 A 12/2006

OTHER PUBLICATIONS

Yu, Y., Zhou, K., Xu, D., Shi, X., Bao, H., Guo, B.,Shum, H., Mesh editing with poisson-based gradient field manipulation, Aug. 2004, ACM International Conference on Computer Graphics and Interactive Techniques, ACM SIGGRAPH 2004 Papers, pp. 644-651.*
"Vector Eye", http://www.siame.com/converter.html, Apr. 2003.
Battiato, et al., "SVG Rendering of Real Images Using Data Dependent Triangulation", Proceedings of the 20th spring conference on Computer graphics, Date: 2004, pp. 185-192, ACM Press, New York, US, Apr. 2004.
Kalvin, et al., "Superfaces: Polygonal Mesh Simplification with Bounded Error", Date: May 1996, pp. 64-77, vol. 16, Issue 3.
International Search Report and Written Opinion for PCT/US2008/062970: issued Sep. 23, 2008.

* cited by examiner

*Primary Examiner* — Said Broome
(74) *Attorney, Agent, or Firm* — Carole Boelitz; Micky Minhas (57) ABSTRACT

A method for creating an optimized gradient mesh of a vector-based image from a raster-based image. In one implementation, a set of boundaries for an object on a raster-based image may be received. An initial gradient mesh of the object may be created. A residual energy between the object on the raster-based image and a rendered initial gradient mesh may be minimized to generate an optimized gradient mesh.

17 Claims, 6 Drawing Sheets

CREATING OPTIMIZED GRADIENT MESH OF A VECTOR-BASED IMAGE FROM A RASTER-BASED IMAGE

BACKGROUND

Typically, images may be saved on a computer as raster-based representations or vector-based representations. Raster-based images, or bitmaps, may be defined as a data file or structure representing a generally rectangular grid of pixels, or points of color. Vector-based images may represent an image through the use of geometric objects such as points, lines, curves and polygons, which may be based upon mathematical equations. In some applications, a vector-based image may be advantageous. For example, vector-based images may be scaled indefinitely without degradation; but raster images lose clarity when scaled because they are based on pixels. Depending upon how they are created, vector-based images may be scalable, editable, easily stylized and easily animated. However, vector-based images may be very time consuming for an artist to create. Also, it may be difficult to create photo realistic vector-based images.

Currently vector-based images are typically drawn manually on the computer. Most computer vector-based drawing systems may provide various methods to draw geometric objects such as points, lines, curves and polygons. Color changes may be applied linearly or along the paths of the curves or within the fill regions of polygons. However, drawing complex, multi-colored images may be extremely difficult. The more complex the vector-based images are, the more difficult they would be to edit.

A gradient mesh, which is a drawing tool, may be used to create a multi-colored mesh on which colors may flow in different directions and transition smoothly. In general, gradient mesh images may have a simpler structure and, therefore, may be easier to edit than other vector-based images. However, as with other forms of vector-based images, gradient mesh images may be difficult and time consuming to create. A few techniques exist to semi-automatically convert a raster-based image to a vector-based image. However, each of these techniques results in a vector-based image that is difficult to edit.

SUMMARY

Described herein are implementations of various techniques for creating an optimized gradient mesh of a vector-based image from a raster-based image. In one implementation, a raster-based image may be received. User selected boundaries for an object on the raster-based image may then be received. An initial gradient mesh of the object may be created. The initial gradient mesh may then be rendered. By minimizing a residual energy between the object on the raster-based image and the rendered initial gradient mesh, an optimized gradient mesh may be generated. The optimized gradient mesh may then be rendered. The residual energy between the object on the raster-based image and the rendered initial gradient mesh may be minimized by first calculating the residual energy and then applying a Levenberg-Marquardt (LM) algorithm to minimize the residual energy.

In one implementation, the initial gradient mesh may be created by evenly distributing one or more control points over the object such that an n×m mesh of rectangular patches is created to cover an area defined by the boundaries of the object.

In another implementation, the initial gradient mesh may be created by receiving user selected control points on the object and adding horizontal and vertical gradient mesh lines passing through the received control points to cover an area defined by the boundaries of the object.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In general, one or more implementations described herein are directed to various techniques for creating an optimized gradient mesh of a vector-based image from a raster-based image. In one implementation, a user may select an object from a raster-based image. An initial gradient mesh may then be automatically or semi-automatically created. An optimized gradient mesh representation of a vector-based image may then be generated by minimizing the difference between the raster-based image and the rendered initial gradient mesh. The optimized gradient mesh may then be saved and rendered. One or more implementations of various techniques for creating an optimized gradient mesh representation of a vector-based image are described in more detail with reference to FIGS. 1-4 in the following paragraphs.

As used herein, a gradient mesh may be defined as a drawing tool used to create a vector-based image. A gradient mesh may be a grid of control points in which each control point is assigned a color such that colors may flow in different directions and transition smoothly. A gradient mesh may be a topologically rectangular patch made up of multiple Ferguson patches. A Ferguson patch may be defined as a rectangular patch defined by four control points.

Figure 1A:
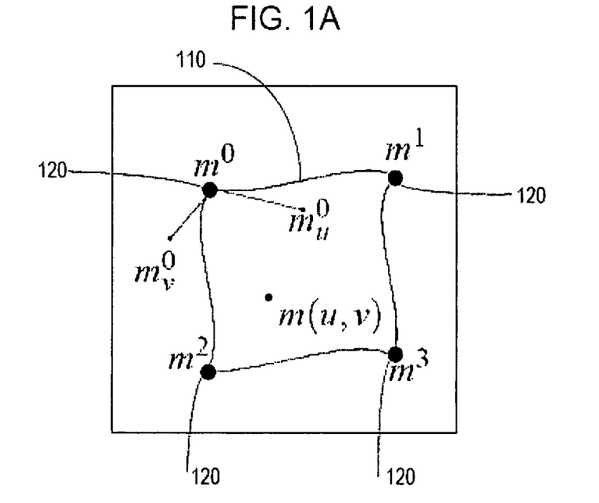
FIG. 1A-B illustrate a Ferguson patch and a gradient mesh made up of Ferguson patches in accordance with implementations of various techniques described herein.

FIG. 1A illustrates a Ferguson patch 110. Four control points 120 may define the corners of the Ferguson patch. These control points may correspond with position vectors ($m^0$, $m^1$, $m^2$ and $m^3$) and partial derivatives ($m_u$ and $m_v$), which may be edited to alter the shape and color of the corresponding Ferguson patch. A Ferguson patch may be defined by the following equations, where Equation 1 describes the geometry of the patch and Equation 2 describes the color of the patch.

$$m(u,v)=F(u)Q_pF^T(v)=UCQ_pC^TV \qquad \text{Equation 1}$$

$$f(u,v)=UCQ_p^fC^TV \qquad \text{Equation 2}$$

where m(u,v) is the position vector of a point (u,v), the F vectors consist of the basis functions and Q, C, U and V are represented by the following matrices.

$$Q = \begin{bmatrix} m^0 & m^2 & m_v^0 & m_v^2 \\ m^1 & m^3 & m_v^1 & m_v^3 \\ m_u^0 & m_u^2 & m_{uv}^0 & m_{uv}^2 \\ m_u^1 & m_u^3 & m_{uv}^1 & m_{uv}^3 \end{bmatrix},$$

$$C = \begin{bmatrix} 1 & 0 & 0 & 0 \\ 0 & 0 & 1 & 0 \\ -3 & 3 & -2 & -1 \\ -2 & 2 & 1 & 1 \end{bmatrix},$$

$$U = [1 \quad u \quad u^2 \quad u^3],$$

$$V = [1 \quad v \quad v^2 \quad v^3].$$

The variables $m_u$ and $m_v$ are first order partial derivatives. The variable $m_{uv}$ is a second order partial derivative and may be set to zero. Each Q matrix may be a function of the control points of a single Ferguson patch, p. $Q_p$ represents a matrix of control point variables defining the geometry of the patch p and $Q_p^f$ represents a matrix of control point variables defining the color of the patch p.

Figure 1B:
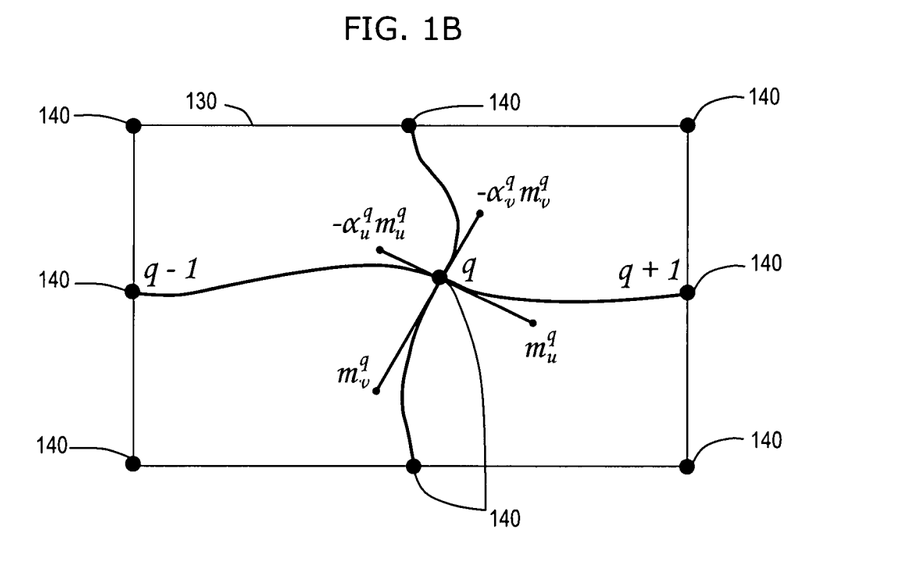

A gradient mesh may be made up of multiple Ferguson patches such that a gradient mesh may be defined as $M=\{Q_p, Q_p^f\}_{p=1}^P$, where P equals the number of patches in the gradient mesh. For each control point in the gradient mesh, three types of variables may be interactively edited: position, partial derivatives and Red, Green, Blue (RGB) color. The 2D position of control point q may be defined as $\{x^q, y^q\}$. The partial derivatives may be specified by direction handles and may be represented as $\{m_u^q, m_v^q, \alpha_u^q m_u^q, \alpha_v^q m_v^q\}$. The RGB color may be defined as $c^q=\{c^q(r), c^q(g), c^q(b)\}$. The control point variables are contained in the $Q_p$ and $Q_p^f$ matrices. As the control points in the gradient mesh are moved or edited, the position, partial derivatives and RGB color may be changed. An image may be created using a gradient mesh by defining the position, partial derivatives and RGB color of various control points. FIG. 1B illustrates a gradient mesh 130 made up of four Ferguson patches defined by nine control points 140. As illustrated in FIG. 1B, within a gradient mesh, Ferguson patches may share control points 140. Various gradient mesh techniques will be described in more detail with reference to FIGS. 2-4 in the following paragraphs.

Implementations of various techniques described herein may be operational with numerous general purpose or special purpose computing system environments or configurations. Examples of well known computing systems, environments, and/or configurations that may be suitable for use with the various techniques described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various techniques described herein may be implemented in the general context of computer-executable instructions, such as program modules, being executed by a computer. Generally, program modules include routines, programs, objects, components, data structures, etc. that perform particular tasks or implement particular abstract data types.

The various techniques described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Figure 2:
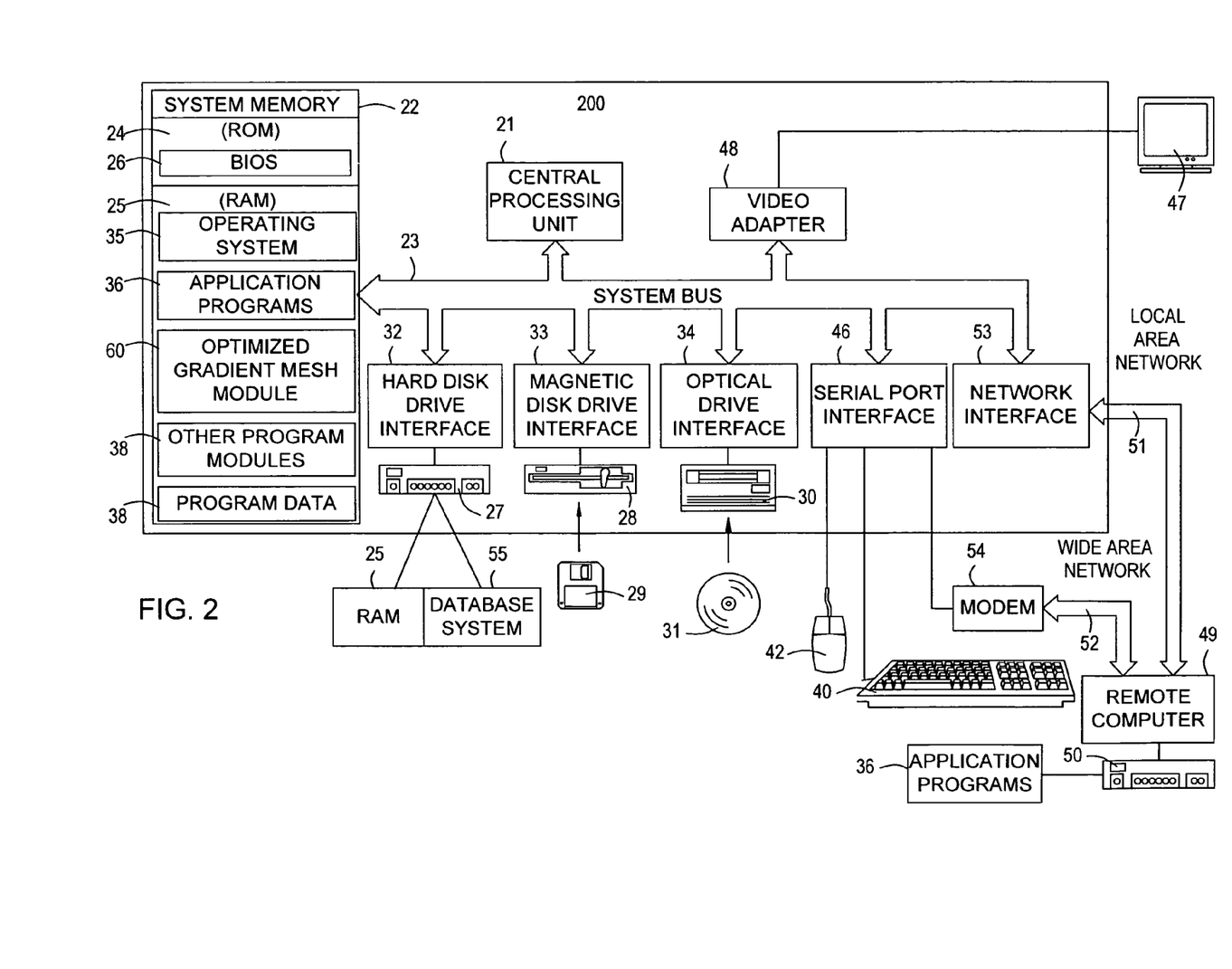
FIG. 2 illustrates a schematic diagram of a computing system in which the various techniques described herein may be incorporated and practiced.

FIG. 2 illustrates a schematic diagram of a computing system 200 in which the various techniques described herein may be incorporated and practiced. Although the computing system 200 may be a conventional desktop or a server computer, as described above, other computer system configurations may be used.

The computing system 200 may include a central processing unit (CPU) 21, a system memory 22 and a system bus 23 that couples various system components including the system memory 22 to the CPU 21. Although only one CPU is illustrated in FIG. 2, it should be understood that in some implementations the computing system 200 may include more than one CPU. The system bus 23 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 22 may include a read only memory (ROM) 24 and a random access memory (RAM) 25. A basic input/output system (BIOS) 26, containing the basic routines that help transfer information between elements within the computing system 200, such as during start-up, may be stored in the ROM 24.

The computing system 200 may further include a hard disk drive 27 for reading from and writing to a hard disk, a magnetic disk drive 28 for reading from and writing to a removable magnetic disk 29, and an optical disk drive 30 for reading from and writing to a removable optical disk 31, such as a CD ROM or other optical media. The hard disk drive 27, the magnetic disk drive 28, and the optical disk drive 30 may be connected to the system bus 23 by a hard disk drive interface 32, a magnetic disk drive interface 33, and an optical drive interface 34, respectively. The drives and their associated computer-readable media may provide nonvolatile storage of computer-readable instructions, data structures, program modules and other data for the computing system 200.

Although the computing system 200 is described herein as having a hard disk, a removable magnetic disk 29 and a removable optical disk 31, it should be appreciated by those skilled in the art that the computing system 200 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 200. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

A number of program modules may be stored on the hard disk, magnetic disk 29, optical disk 31, ROM 24 or RAM 25, including an operating system 35, one or more application programs 36, an optimized gradient mesh module 60, program data 38 and a database system 55. The operating system 35 may be any suitable operating system that may control the operation of a networked personal or server computer, such as Windows® XP, Mac OS® X, Unix-variants (e.g., Linux® and BSD®), and the like. The optimized gradient mesh module 60 will be described in more detail with reference to FIGS. 3-4 in the paragraphs below.

A user may enter commands and information into the computing system 200 through input devices such as a keyboard 40 and pointing device 42. Other input devices may include a microphone, joystick, game pad, satellite dish, scanner, or the like. These and other input devices may be connected to the CPU 21 through a serial port interface 46 coupled to system bus 23, but may be connected by other interfaces, such as a parallel port, game port or a universal serial bus (USB). A monitor 47 or other type of display device may also be connected to system bus 23 via an interface, such as a video adapter 48. In addition to the monitor 47, the computing system 200 may further include other peripheral output devices, such as speakers and printers.

Further, the computing system 200 may operate in a networked environment using logical connections to one or more remote computers, such as a remote computer 49. The remote computer 49 may be another personal computer, a server, a router, a network PC, a peer device or other common network node. Although the remote computer 49 is illustrated as having only a memory storage device 50, the remote computer 49 may include many or all of the elements described above relative to the computing system 200. The logical connections may be any connection that is commonplace in offices, enterprise-wide computer networks, intranets, and the Internet, such as local area network (LAN) 51 and a wide area network (WAN) 52.

When using a LAN networking environment, the computing system 200 may be connected to the local network 51 through a network interface or adapter 53. When used in a WAN networking environment, the computing system 200 may include a modem 54, wireless router or other means for establishing communication over a wide area network 52, such as the Internet. The modem 54, which may be internal or external, may be connected to the system bus 23 via the serial port interface 46. In a networked environment, program modules depicted relative to the computing system 200, or portions thereof, may be stored in a remote memory storage device 50. It will be appreciated that the network connections shown are exemplary and other means of establishing a communications link between the computers may be used.

It should be understood that the various techniques described herein may be implemented in connection with hardware, software or a combination of both. Thus, various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 3:
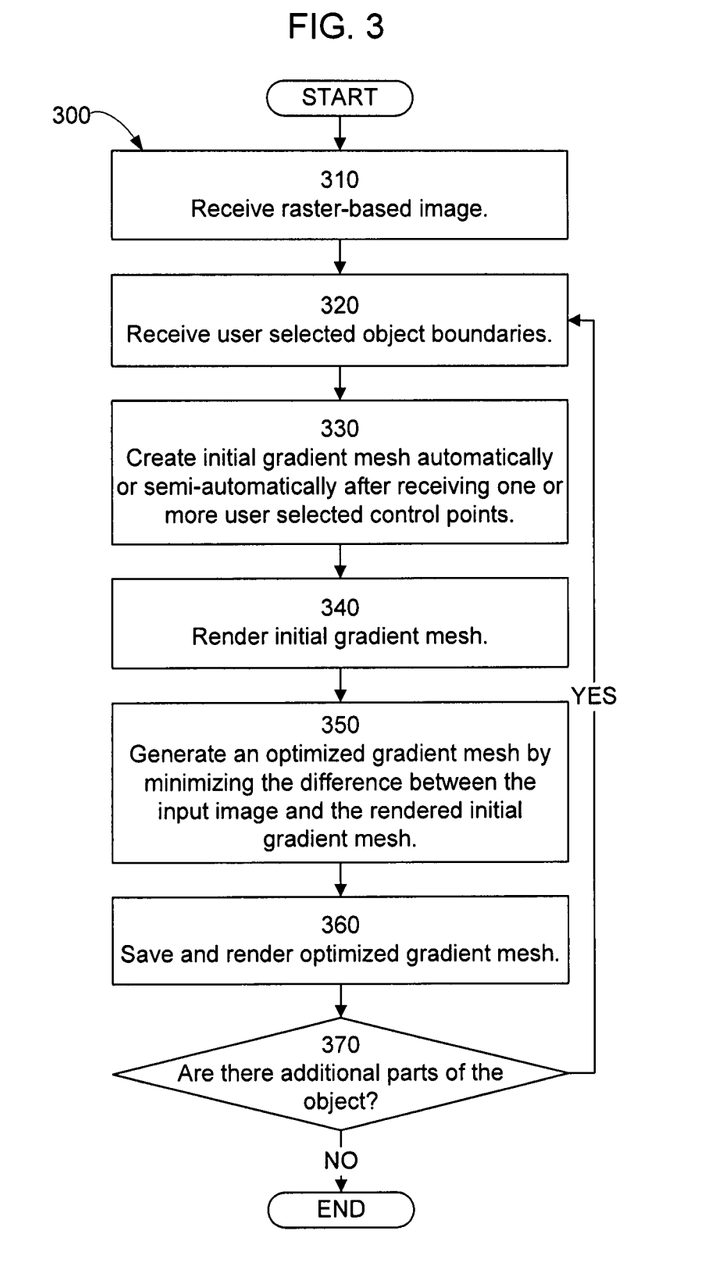
FIG. 3 illustrates a flow diagram of a method for creating an optimized gradient mesh representation of a vector-based image from a raster-based image in accordance with implementations of various techniques described herein.

FIG. 3 illustrates a flow diagram of a method 300 for creating an optimized gradient mesh representation of a vector-based image from a raster-based image in accordance with implementations of various techniques described herein. It should be understood that while the operational flow diagram of the method 300 indicates a particular order of execution of the operations, in some implementations, the operations might be executed in a different order.

Figure 4A:
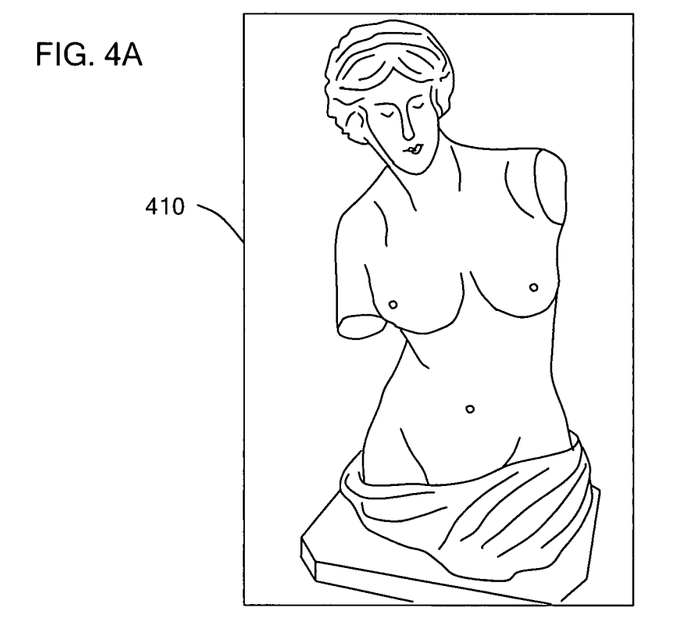
FIG. 4A-F illustrate the method for creating an optimized gradient mesh representation of a vector-based image from a raster-based image in accordance with implementations of various techniques described herein.

At step 310, the optimized gradient mesh module 60 may receive a raster-based image. FIG. 4A illustrates an example of a raster-based image 410 that may be received.

At step 320, the optimized gradient mesh module 60 may receive user selected object boundaries. Depending on the complexity of the raster-based image, the image may be converted as one object or separated into two or more objects that may be converted separately. If the image is converted as two or more objects, the boundaries of the selected objects may overlap each other such that when the objects are reassembled the overlapping gradient meshes may hide color discontinuities.

Figure 4B:
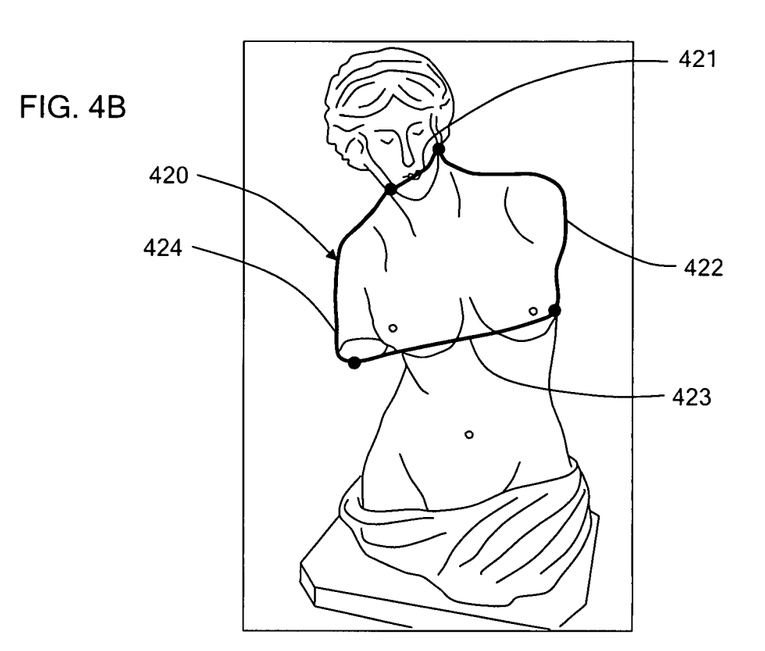

Each object boundary may consist of four segments approximating a rectangle. As described in the above paragraphs, a gradient mesh may be made up of one or more Ferguson patches which may be defined by four control points, resulting in four mesh line segments. In one implementation, a user may draw the four segments to delineate an object boundary using a standard spline editing tool. Each segment may be converted to one or more cubic B splines. A spline may be defined as a cubic curve between a pair of control points. Splines may be connected at control points. To make sure that curves join together smoothly, the first and second derivative at the end of one curve must equal the first and second derivative at the start of the next curve. B-splines are a category of splines in which modifying one control point only affects the part of the curve near that control point. In other implementations, a user may use an interactive image cutout tool to extract the boundary of an object. The user may then manually split the selected boundary into four segments that may be converted to cubic B splines. FIG. 4B illustrates a selected object boundary 420. Note that the boundary is separated into four segments 421, 422, 423 and 424.

After step 320, an optional step may be performed in which occluded regions in an object may be smoothed. For example, when converting a human face from a raster-based image to a vector-based image, the eyes may be converted as separate objects from the face. Therefore, before the face is converted to a vector-based image, the eyes may be smoothed out such that the vector-based eye images may be overlaid on smooth areas of the vector-based face image.

Figure 4C:
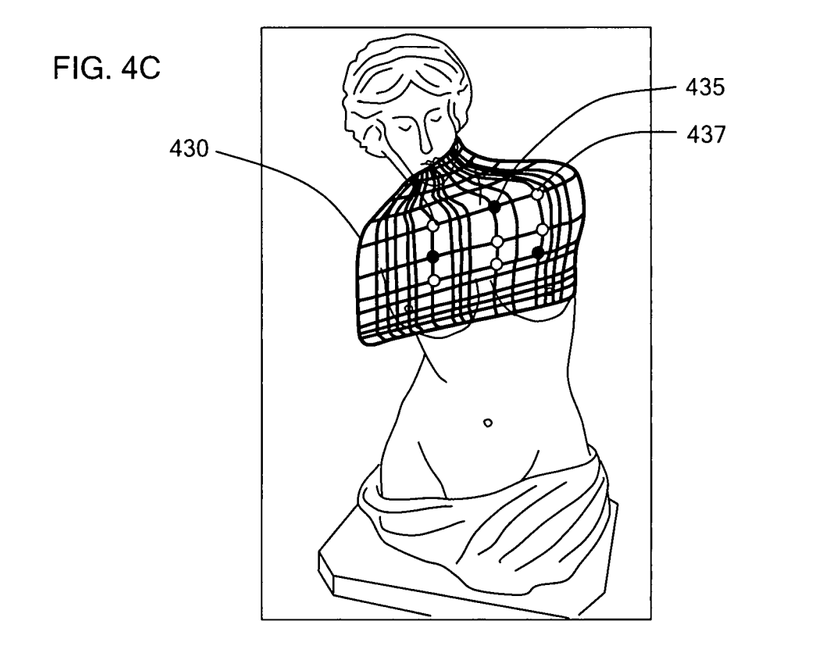

At step 330, an initial gradient mesh may be automatically or semi-automatically created. The optimized gradient mesh module 60 may automatically create an initial gradient mesh by evenly distributing control points over the object selected in step 320 such that an n×m mesh of rectangular patches is created. In other implementations, the initial gradient mesh may be created semi-automatically. The optimized gradient mesh module 60 may receive user selected control points. The optimized gradient mesh module 60 may then add the horizontal and vertical gradient mesh lines passing through the user selected control points following the object boundary 420 curvature. It should be noted that the user may need to select only one control point defining each horizontal line and vertical line and other control points may be automatically added by the optimized gradient mesh module 60 where gradient mesh lines cross. FIG. 4C illustrates an initial gradient mesh 430 that was created semi-automatically. The initial gradient mesh 430 is not evenly distributed, rather user selected control points 435 (indicated by black dots) were received by the optimized gradient mesh module 60. The optimized gradient mesh module 60 then added horizontal and vertical gradient mesh lines to pass through each user selected control point 435 (black dots). Because the user may have select only one control point defining each horizontal and vertical line, other control points 437 (indicated by white dots) may be automatically added by the optimized gradient mesh module 60 where gradient mesh lines cross. Note that only a few of the user selected control point 435 (black dots) and automatically added control points 437 (white dots) are indicated in FIG. 4C.

Figure 4D:
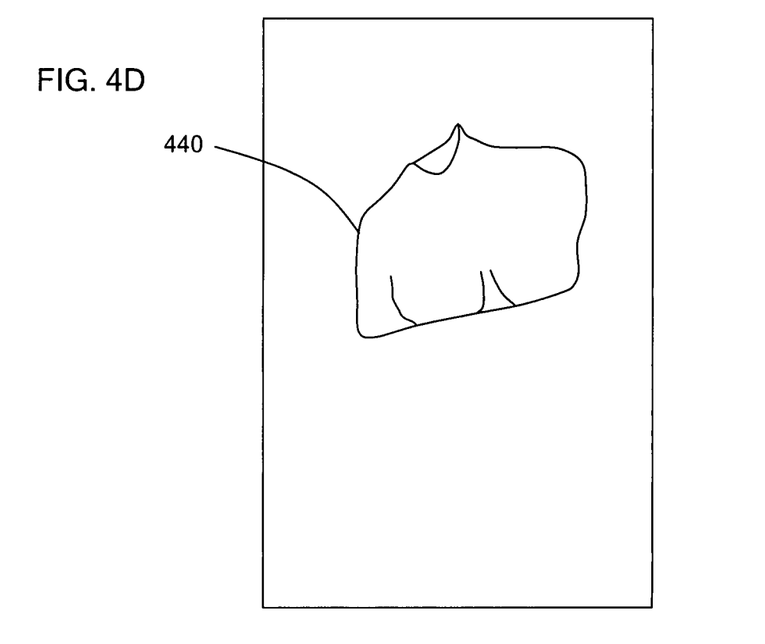

At step 340, the initial gradient mesh 430 may be rendered. The initial gradient mesh 430 may be defined as $M_{initial}=\{Q_p, Q_p^f\}_{p=1}^{P}$ where P equals the number of patches in the initial gradient mesh 430. Equations 1 and 2 may be used to render the initial gradient mesh 430. FIG. 4D illustrates a rendered initial gradient mesh 440.

At step 350, an optimized gradient mesh may be generated by minimizing the difference between the rendered initial gradient mesh 440 of the selected object and the corresponding objection portion on the received raster-based image 410. In one implementation, the difference between rendered initial gradient mesh 440 and the corresponding objection portion on the received raster-based image 410 may be determined by minimizing the residual energy in the following energy equation.

$$E(M) = \sum_{p=1}^{P} \sum_{u,v} \|I_p(m(u, v)) - f_p(u, v)\|^2 \quad \text{Equation 3}$$

where u and v are discrete parametric coordinates in each Ferguson patch p and $I_p$ is the raster-based image 410 region in the patch p. Equation 3 is the reconstruction residual energy between the rendered initial mesh 440 and the corresponding objection portion of the raster-based image 410. E(M) may be minimized as a non-linear least squares (NLLS) problem. The residual energy may be written in the form, $E=\Sigma a_k\|f_k(z)\|^2$, where z is the vector form of unknown variables in M. Therefore, z may be the stack of unknown variables for all control points in the gradient mesh, including the 2D positions, partial derivatives and RGB colors for all control points. Minimizing the residual energy may be achieved by optimizing the stack of unknown variables z. The optimized unknown variables for each Ferguson patch p, represented by each optimized matrix $Q_p$, may be thus be determined. Optimization of all of the Ferguson patches gives us the optimized gradient mesh $M_{optimized}$. Because the difference between the received raster-based image 410 and the rendered initial gradient mesh 440 may be minimized and not eliminated, a small reconstruction error, which is the difference between the received raster-based image 410 and the optimized gradient mesh, may result.

In one implementation, the Levenberg-Marquardt (LM) algorithm may be used to minimize the residual energy in Equation 3 by solving the NLLS problem. The LM algorithm may require the computation of a Jacobian, or derivative information, represented as $$(J_k)i = \frac{\partial f_k(z)}{\partial z_i}.$$

Since $f_k$ contains an image observation, the derivative of the image may be required and may be computed by convolution with a derivative of Gaussian filter. The Jacobian matrix may be block-sparse because each $J_k$ is only dependent on its neighboring control points. In one implementation, a standard LM algorithm implementation may be used with sparse matrix support. In order to avoid local minima and make the solver robust, a Gaussian pyramid from the raster-based image 410 may be built and a coarse-to-fine optimization for the LM algorithm may be applied. The LM algorithm may be used to simultaneously optimize all the $Q_p$ matrices and yield an optimized gradient mesh $M_{optimized}$.

In one or more implementations, the LM algorithm may include a boundary constraint such that during optimization control points along the boundaries only move along the boundary edges. For example as described in step 320, the boundary may be divided into four segments that may be described by one or more cubic B-splines. A control point q on a boundary spline S in the u direction may have a reduced number of unknown variables. The unknown variables may be $\{t,m_v,c_u,c_v\}$, where t is the parametric coordinate of the control point q on the boundary spline S. The scale $\alpha_v$ may be one and the variables $m_u$ and $\alpha_u$ may be a function of t. If two adjacent control points of the control point q are q−1 and q+1, then the enforced boundary constraints may be $$m_u = \frac{\partial S}{\partial t}(t_{q+1} - t_q) \text{ and } \alpha_u = \frac{(t_q - t_{q-1})}{(t_{q+1} - t_q)}, \text{ where } \frac{\partial S}{\partial t}$$

is the derivative of the boundary spline S. The boundary constraints in the v direction may be similarly enforced. Although various implementations described herein are with reference to the LM algorithm, it should be understood that in some implementations other techniques for minimizing the residual energy, such the Gauss-Newton method and the like, may be used.

Figure 4E:
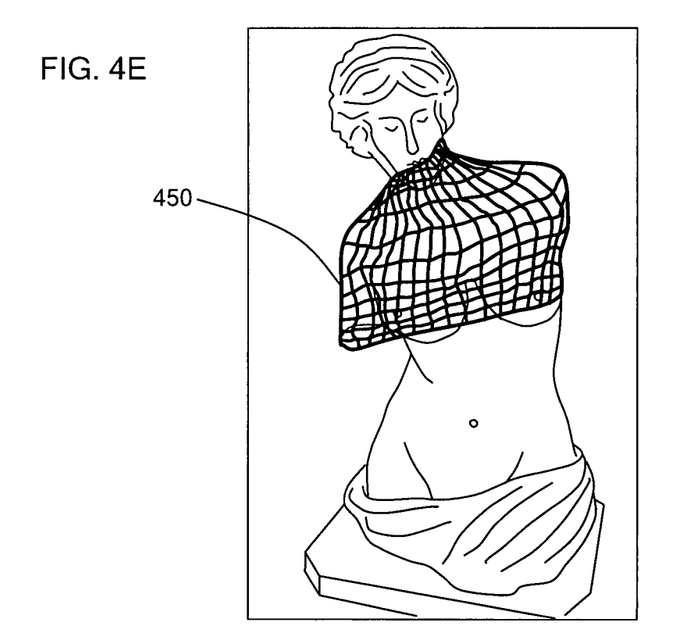

In other implementations, a smoothness constraint may be added to Equation 3 to yield an energy equation used to minimize the residual energy between the received raster-based image 410 and the rendered initial gradient mesh 440 with a smoothness term. The following equation results.

$$E'(M) = \quad \text{Equation 4}$$

$$E(M) + \lambda \sum_{p=1}^{P} \sum_{s,t} [\|m(s-\Delta s, t) - 2m(s,t) + m(s+\Delta s, t)\|^2 +$$

$$\|m(s, t-\Delta t) - 2m(s,t) + m(s, t+\Delta t)\|^2]$$

where s and t are discrete parametric coordinates and $\Delta s$ and $\Delta t$ are sampling intervals which may be set as five times the sampling intervals of u and v, respectively. The parameter $\lambda$ may balance the influence of the original residual energy equation and the added smoothness term. The parameter $\lambda$ may have a default value of 50. The smoothness constraint may reduce the reconstruction error when compared to Equation 3 by overcoming local minima. Further, the smoothness constraint may result in a smooth optimized gradient mesh. FIG. 4E illustrates an optimized gradient mesh 450 generated using Equation 4. Notably, the optimized gradient mesh 450 is smooth due to the smoothness constraint added into Equation 4.

In other implementations, Equation 4 may be further modified to allow for user guided optimization. A user may specify a few vector lines in the raster-based image at step 320 or step 330. The user specified vector lines may be configured to control the optimization of the gradient mesh. Vector fields may be computed in a narrow band along the user specified vector lines. If vector fields $V_u$ and $V_v$ on the u and v directions are computed, the optimized energy equation may be modified by adding a new energy term as follows.

$$E''(M) = E'(M) + \quad \text{Equation 5}$$

$$\beta \sum_{p=1}^{P} \sum_{u,v} \left[ w_u(m(u,v)) \left\langle \frac{\partial m(u,v)}{\partial u}, \perp V_u(m(u,v)) \right\rangle^2 + \right.$$

$$\left. w_v(m(u,v)) \left\langle \frac{\partial m(u,v)}{\partial v}, \perp V_v(m(u,v)) \right\rangle^2 \right]$$

where $\langle \rangle$ is the dot-product operator, $$\frac{\partial m(u,v)}{\partial u}$$

is the derivative in the u direction, $$\frac{\partial m(u,v)}{\partial v}$$

is the derivative in the v direction, $\perp V_u (m(u,v))$ is the unit normal vector of the $V_u$ at location m(u,v), and $\perp V_v (m(u,v))$ is the unit normal vector of the $V_v$ at location m(u,v). The parameter $\beta$ may balance the influence of the residual energy equation with the smoothness term and the added new energy term. The parameter $\beta$ may have a default value of 20. The weight expressions, $w_u(m(u,v))$ and $w_v(m(u,v))$, may be equal to the Gaussian falloff factors. The Gaussian falloff factors may be represented by $w_u(m(u,v))=G(d|0,\sigma_v^2)$ and $w_v(m(u,v))=G(d|0,\sigma_u^2)$, where d is the distance from location m(u,v) to the nearest vector line, and $\sigma_v$ and $\sigma_u$ are the standard deviations set to one third the width of the computed vector field along the vector line. The new energy term may increase consistency between optimized gradient mesh lines and the user specified vector lines.

Figure 4F:
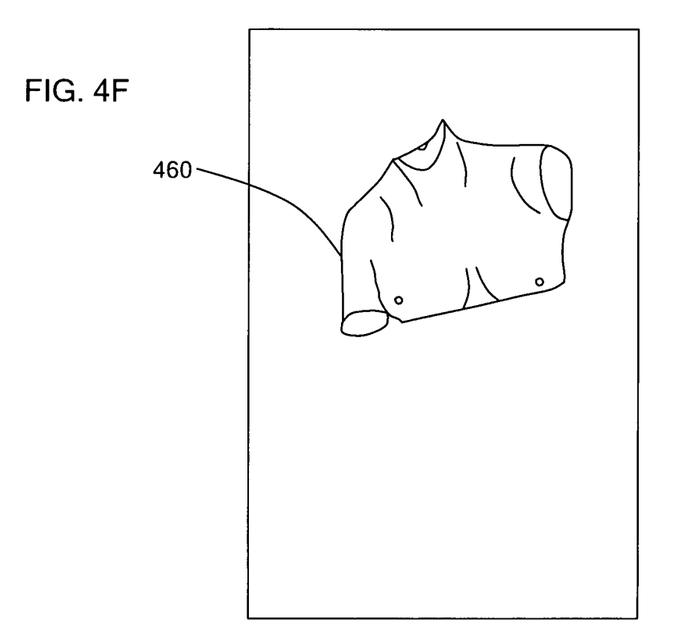

At step 360, the optimized gradient mesh module 60 may save the optimized gradient mesh 450 to memory and render the optimized gradient mesh 450 for display. Equations 1 and 2 may be used to render the optimized gradient mesh 450, $M_{optimized}=\{Q_p,Q_p^f\}_{p=1}^{P}$. It should be noted that a standard rendering algorithm may be used which includes standard anti-aliasing. Additionally, a Bayesian matting algorithm may be used along the optimized gradient mesh edges to insure proper color sampling along the edges. FIG. 4F illustrates a rendered optimized gradient mesh 460.

At step 370, the optimized gradient mesh module 60 may receive a request to return to step 320 such that another object of the raster-based image 410 may be selected. Alternatively, the optimized gradient mesh module 60 may receive a notification that the process is complete.

It should be noted that various optimized gradient meshes of various objects may be then be used to reconstruct images, edit objects, create new images and the like. In one implementation, the optimized gradient meshes may be combined to reconstruct the raster-based image. Further, various optimized gradient meshes from different raster-based images may be combined to create new images.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving a set of boundaries for an object portrayed in a raster-based image;
   utilizing a processor that is a component of a computer to generate an initial gradient mesh of the object, the initial gradient mesh bounded by the set of boundaries and including control points, wherein the initial gradient mesh comprises a grid of two-dimensional control points;
   calculating a residual energy between the object in the raster-based image and the initial gradient mesh, wherein the residual energy is indicative of differences between the raster-based image and the initial gradient mesh; and
   generating an optimized gradient mesh by modifying one or more of the control points from the initial gradient mesh based on the residual energy.

2. A method comprising:
   receiving a set of boundaries for an object portrayed in a raster-based image;
   utilizing a processor that is a component of a computer to generate an initial gradient mesh of the object, the initial gradient mesh bounded by the set of boundaries and including control points, each control point having one or more associated variables that define attributes of the control point in the initial gradient mesh; and
   generating an optimized gradient mesh by moving at least one of the control points in the initial gradient mesh to a new position within the set of boundaries, wherein the control points are moved based at least in part on differences determined by minimizing a residual energy between the object in the raster-based image and the initial gradient mesh.

3. A method comprising:
receiving a set of boundaries for an object portrayed in a raster-based image;
utilizing a processor that is a component of a computer to create an initial gradient mesh of the object, the initial gradient mesh bounded by the set of boundaries and including a set of patches, each patch being defined by a set of control points having associated variables and gradient mesh lines that pass through a number of control points, wherein the variables comprise at least one of a position, a partial derivative, and a color associated with the control point;
optimizing the set of patches within the set of boundaries based on control point variables in each patch to generate an optimized gradient mesh.

4. The method of claim 3, and further comprising:
receiving vector lines defined in the raster-based image; and
utilizing the vector lines to generate the optimized gradient mesh.

5. The method of claim 3, wherein the control point variables in each patch define a color of the patch.

6. The method of claim 1, and further comprising:
generating a first set of two-dimensional control points for the initial gradient mesh.

7. The method of claim 6, and further comprising:
generating a second set of two-dimensional control points for the optimized gradient mesh.

8. The method of claim 7, wherein the first and the second sets of control points comprise an n×m mesh of patches that is created to cover an area defined by the boundaries of the object, wherein n and m comprise any arbitrary positive integers greater than one.

9. The method of claim 8, wherein each of the control points in the first and the second sets of control points comprises a position.

10. The method of claim 9, wherein the positions of at least some of the control points in the first set of control points are different than the positions of the control points in the second set of control points.

11. The method of claim 2, and further comprising:
dividing the raster-based image into multiple objects; and
generating an optimized gradient mesh for each of the objects.

12. The method of claim 2, wherein generating the initial gradient mesh comprises automatically evenly distributing one or more of the control points such that an n×m mesh of patches is created to cover an area defined by the boundaries of the object, wherein n and in comprise any arbitrary positive integers greater than one.

13. The method of claim 2, wherein generating the initial gradient mesh comprises:
receiving a user selection of one or more of the control points; and
adding one or more rectilinear gradient mesh lines passing through the received control points to cover an area defined by the boundaries of the object.

14. The method of claim 3, wherein moving the at least one control point comprises changing the one or more associated variables associated with the at least one control point.

15. The method of claim 3, wherein generating the initial gradient mesh comprises automatically evenly distributing one or more control points such that an n×m mesh of the patches is created to cover an area defined by the boundaries of the object, wherein n and m comprise any arbitrary positive integers greater than one.

16. The method of claim 3, wherein the generating the initial gradient mesh comprises:
receiving one or more user selected control points; and
adding one or more rectilinear gradient mesh lines passing through the received control points to cover an area defined by the boundaries of the object.

17. The method of claim 3, and further comprising:
receiving one or more user-specified vector lines in the raster-based image; and
utilizing the user-specified vector lines to generate the optimized gradient mesh.

* * * * *